(12) United States Patent
Hwang et al.

(10) Patent No.: US 8,585,531 B2
(45) Date of Patent: *Nov. 19, 2013

(54) INDEPENDENTLY CONTROLLABLE TRANSMISSION MECHANISM WITH AN IDENTITY-RATIO SERIES TYPE

(75) Inventors: Guan-Shyong Hwang, Kaohsiung (TW); Der-Min Tsay, Kaohsiung (TW); Chung-Chi Lin, Kaohsiung (TW); Jao-Hwa Kuang, Kaohsiung (TW); Tzuen-Lih Chern, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 378 days.

This patent is subject to a terminal disclaimer.

(21) Appl. No.: 13/007,604

(22) Filed: Jan. 15, 2011

(65) Prior Publication Data
US 2011/0111904 A1    May 12, 2011

Related U.S. Application Data

(63) Continuation-in-part of application No. 12/547,669, filed on Aug. 26, 2009.

(51) Int. Cl.
*F16H 37/02* (2006.01)
(52) U.S. Cl.
USPC ........... 475/219; 475/207; 475/209; 475/218; 475/329; 475/330
(58) Field of Classification Search
USPC .................. 475/207, 209, 218, 219, 329, 330
See application file for complete search history.

(56) References Cited

U.S. PATENT DOCUMENTS

| | | | | |
|---|---|---|---|---|
| 3,046,814 | A | * | 7/1962 | Soehrman ...................... 475/211 |
| 4,191,070 | A | * | 3/1980 | McKinniss .................... 475/302 |
| 4,936,165 | A | * | 6/1990 | Doyle et al. .................... 475/72 |
| 6,387,004 | B1 | | 5/2002 | Parrish |
| 2007/0173366 | A1 | * | 7/2007 | Goma Ayats ................ 475/207 |
| 2011/0053722 | A1 | * | 3/2011 | Hwang et al. ...................... 475/1 |
| 2012/0021865 | A1 | * | 1/2012 | Hwang et al. ................. 475/330 |
| 2012/0021866 | A1 | * | 1/2012 | Hwang et al. ................. 475/330 |

FOREIGN PATENT DOCUMENTS

TW            242521        11/2005

* cited by examiner

*Primary Examiner* — Derek D Knight
(74) *Attorney, Agent, or Firm* — Alan Kamrath; Kamrath IP Lawfirm, P.A.

(57) ABSTRACT

An independently controllable transmission mechanism with an identity-ratio series type includes a first planetary gear train and a second planetary gear train mechanically connected therewith. The transmission mechanism has a power output end, a transmission control end, a power input end and a free transmission end. The power output end and the transmission control end are provided on the first planetary gear train and the second planetary gear train, respectively. The power input end is provided on the first planetary gear train or the second planetary gear train while the free transmission end is provided on the second planetary gear train or the first planetary gear train. The transmission control end is operated to freely shift the free transmission end as a power input end or a power output end.

18 Claims, 11 Drawing Sheets

INDEPENDENTLY CONTROLLABLE TRANSMISSION MECHANISM WITH AN IDENTITY-RATIO SERIES TYPE

CROSS REFERENCE TO RELATED APPLICATIONS

This application is a continuation-in-part of U.S. patent application Ser. No. 12/547,669, filed Aug. 26, 2009, which is hereby incorporated by reference in its entirety.

BACKGROUND OF THE INVENTION

1. Field of the Invention

The present invention relates to an independently controllable transmission mechanism. More particularly, the present invention relates to the independently controllable transmission mechanism utilizing two planetary gear trains for variably controlling power input and output.

2. Description of the Related Art

Taiwanese Patent Pub. No. 1242521 discloses a conventional gearbox structure for vehicles, including a main shaft on which to provide a slide. A forward gear and a drive gear are arranged at each side of the slide. A transmission shaft is provided with a reverse slide and a combination of a backward bevel gear and a forward bevel gear adjacent to the reverse slide. A final gear shaft is arranged between the backward bevel gear and the forward bevel gear. The forward gear and the drive gear are also arranged between the backward bevel gear and the forward bevel gear such that a width of the gearbox can be significantly reduced. Furthermore, the backward bevel gear and the forward bevel gear are used to engage with a transmission bevel gear provided on the final gear shaft so as to minimize the size of the gearbox. With regard to the problematic aspects naturally occurring during use of the gearbox system, the transmission in the gearbox system is susceptible to inefficiency due to the fact that the slide must result in frictional slide movements in the gearbox.

U.S. Pat. No. 6,387,004, entitled "Continuously Variable Transmission," discloses a continuously variable transmission system, including a first planetary gear train and a second planetary gear train. The first planetary gear train and the second planetary gear train are used to correspondingly transmit powers, which are generated from a first motor and a second motor, to a transmission shaft. However, the primary problem with such a transmission system is due to the fact that the powers generated from the first motor and the second motor must be constantly transmitted to the single transmission shaft via the first planetary gear train and the second planetary gear train. In this manner, the transmission shaft is fixedly designated as a single power input end while the first motor and the second motor are designated as two power input ends. The transmission system, however, cannot be functioned to variably control the power output. Hence, there is a need of providing an independently controllable transmission mechanism for variably controlling the power input, and for variably controlling the power output.

As is described in greater detail below, the present invention intends to provide an independently controllable transmission mechanism utilizing two planetary gear trains for variably controlling power input and output. The transmission mechanism includes a power output end, a transmission control end, a power input end and a free transmission end. The transmission mechanism is capable of shifting the free transmission end between a power input end and a power output end for independently controlling the power transmission. The transmission mechanism of the present invention can avoid using any additional frictionally sliding member so as to achieve increasing the efficiency of power transmission.

SUMMARY OF THE INVENTION

The primary objective of this invention is to provide an independently controllable transmission mechanism, wherein two planetary gear trains are utilized to variably control power input and output. The transmission mechanism includes a power output end, a transmission control end, a power input end and a free transmission end. The transmission mechanism is capable of shifting the free transmission end between a power input end and a power output end for independently controlling the power transmission. Accordingly, independently controlling the power transmission of the transmission mechanism can be successfully achieved.

Another objective of this invention is to provide an independently controllable transmission mechanism, wherein two planetary gear trains are utilized to variably control power input and output. No additional frictionally sliding member is utilized in the transmission mechanism. Accordingly, the efficiency of the power transmission of the present invention can be successfully increased.

The independently controllable transmission mechanism in accordance with an aspect of the present invention includes a first planetary gear train and a second planetary gear train. The independently controllable transmission mechanism has a first power output end, a transmission control end, a first power input end and a free transmission end. The power output end is provided on the first planetary gear train and the transmission control end is provided on the second planetary gear train. The free transmission end is provided on the second planetary gear train or the first planetary gear train while the power input end is provided on the first planetary gear train or the second planetary gear train. The transmission control end is used to control the free transmission end to be functioned as a second power input end or a second power output end (i.e. to controllably shift the free transmission end as the second power input end or the second power output end).

In a separate aspect of the present invention, the first planetary gear train includes a first rotational axle, a second rotational axle and a third rotational axle.

In a further separate aspect of the present invention, the first rotational axle of the first planetary gear train performs as the first power output end.

In a yet further separate aspect of the present invention, the second rotational axle of the first planetary gear train performs as the free transmission end or the first power input end.

In a yet further separate aspect of the present invention, the third rotational axle of the first planetary gear train connects with the second planetary gear train. In a yet further separate aspect of the present invention, the first planetary gear train has a positive speed ratio.

In a yet further separate aspect of the present invention, the second planetary gear train includes a first rotational axle, a second rotational axle and a third rotational axle.

In a yet further separate aspect of the present invention, the first rotational axle of the second planetary gear train performs as the transmission control end.

In a yet further separate aspect of the present invention, the second rotational axle of the second planetary gear train performs as the first power input end or the free transmission end.

In a yet further separate aspect of the present invention, the third rotational axle of the second planetary gear train connects with the first planetary gear train.

In a yet further separate aspect of the present invention, the second planetary gear train has a negative speed ratio.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an independently controllable transmission mechanism with an identity-ratio series type in accordance with the preferred embodiment of the present invention can be a wide variety of transmission-related mechanisms applicable to transmission gearboxes of ocean power generators (e.g., tidal power generator, wave power generator or ocean current power generator), wind power generators or hybrid vehicles, which are not limitative of the present invention.

Figure 1A:
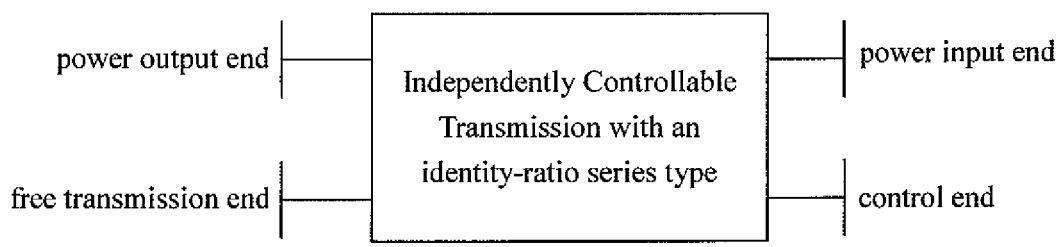
FIGS. 1A and 1B are schematic views of an independently controllable transmission mechanism with an identity-ratio series type in accordance with first and second preferred embodiments of the present invention.
Figure 1B:
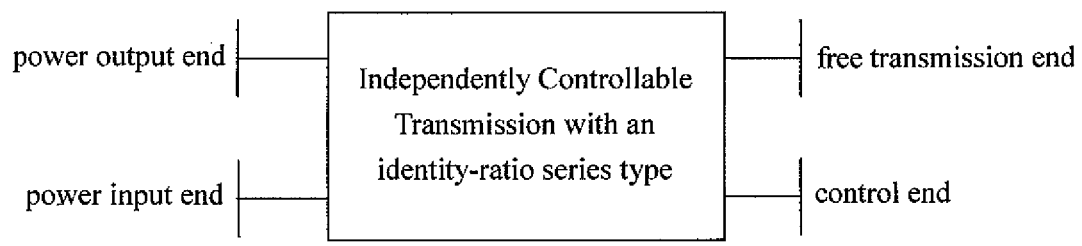
Figure 2A:
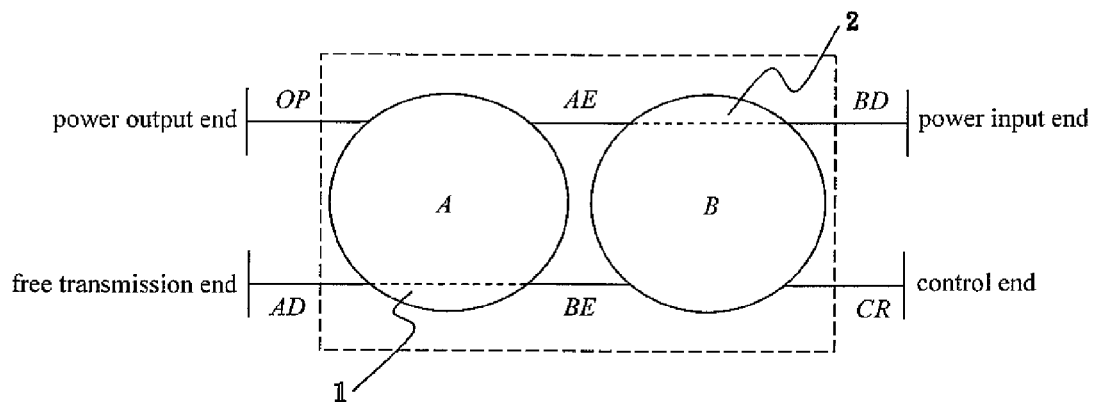
FIGS. 2A and 2B are internal schematic views of the independently controllable transmission mechanism with the identity-ratio series type, depicted in FIGS. 1A and 1B, in accordance with the first and second preferred embodiments of the present invention.
Figure 2B:
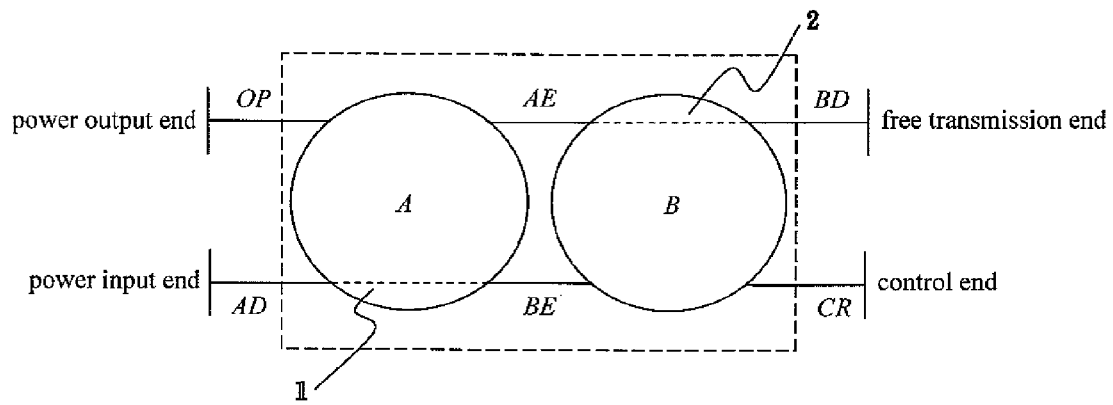

FIGS. 1A and 1B illustrate an independently controllable transmission mechanism with an identity-ratio series type in accordance with first and second preferred embodiments of the present invention; FIGS. 2A and 2B illustrate internal schematic views of the independently controllable transmission mechanism with the identity-ratio series type, depicted in FIGS. 1A and 1B, in accordance with the first and second preferred embodiments of the present invention. Referring to FIGS. 1A, 1B, 2A and 2B, the independently controllable transmission mechanism of the first and second embodiments include a first planetary gear train 1 and a second planetary gear train 2 mechanically connected thereto.

Referring again to FIGS. 1A, 1B, 2A and 2B, the independently controllable transmission mechanism of the first and second embodiments have a first power output end, a transmission control end, a first power input end and a free transmission end which are separately arranged thereon. The first power input end and the first power output end perform as a permanent input end and a permanent output end, respectively.

Referring again to FIGS. 1A and 2A, in the independently controllable transmission mechanism of the first embodiment the first power output end and the free transmission end correspond to the first planetary gear train 1 while the transmission control end and the first power input end correspond to the second planetary gear train.

Referring again to FIGS. 1B and 2B, in the independently controllable transmission mechanism of the second embodiment the first power output end and the first power input end correspond to the first planetary gear train 1 while the transmission control end and the free transmission end correspond to the second planetary gear train.

Still referring to FIG. 2A, in the first embodiment the first planetary gear train 1 has a first rotational axle identified as OP, a second rotational axle identified as AD and a third rotational axle identified as AE. The first rotational axle OP performs as the first power output end of the transmission mechanism. The second rotational axle AD performs as the free transmission end of the transmission mechanism. The third rotational axle AE connects with the second planetary gear train 2. Correspondingly, the second planetary gear train 2 includes a first rotational axle identified as CR, a second rotational axle identified as BD and a third rotational axle identified as BE. The first rotational axle CR performs as the transmission control end of the transmission mechanism. The second rotational axle BD performs as the first power input end of the transmission mechanism. The third rotational axle BE connects with the first planetary gear train 1.

Still referring to FIG. 2B, in the second embodiment the first planetary gear train 1 has a first rotational axle identified as OP, a second rotational axle identified as AD and a third rotational axle identified as AE. The first rotational axle OP performs as the first power output end of the transmission mechanism. The second rotational axle AD performs as the first power input end of the transmission mechanism. The third rotational axle AE connects with the second planetary gear train 2. Correspondingly, the second planetary gear train 2 includes a first rotational axle identified as CR, a second rotational axle identified as BD and a third rotational axle identified as BE. The first rotational axle CR performs as the transmission control end of the transmission mechanism. The second rotational axle BD performs as the free transmission end of the transmission mechanism. The third rotational axle BE connects with the first planetary gear train 1.

Referring again to FIGS. 1A and 2A, in the independently controllable transmission mechanism of the first embodiment the transmission control end (first rotational axle CR) of the second planetary gear train 2 is used to control the free transmission end (second rotational axle AD) of the first planetary gear train 1 to be functioned as a second power input end or a second power output end (i.e. to controllably shift the free transmission end AD as the second power input end or the second power output end). When the free transmission end AD is functioned as the second power input end, the first power input end BD of the second planetary gear train 2 and the free transmission end AD of the first planetary gear train 1 are capable of synchronously inputting power from different sources. Conversely, When the free transmission end AD is functioned as the second power output end, the first power output end OP and the free transmission end AD of the first planetary gear train 1 are capable of synchronously outputting power from the transmission mechanism.

Referring again to FIGS. 1B and 2B, in the independently controllable transmission mechanism of the second embodiment the transmission control end (first rotational axle CR) of the second planetary gear train 2 is used to control the free transmission end (second rotational axle BD) of the second planetary gear train 2 to be functioned as a second power input end or a second power output end (i.e. to controllably shift the free transmission end BD as the second power input end or the second power output end). When the free transmission end BD is functioned as the second power input end, the free transmission end BD of the second planetary gear train 2 and the first power input end AD of the first planetary gear train 1 are capable of synchronously inputting power from different sources. Conversely, When the free transmission end BD is functioned as the second power output end, the first power output end OP of the first planetary gear train 1 and the free transmission end BD of the second planetary gear train 2 are capable of synchronously outputting power from the transmission mechanism.

Figure 3A:
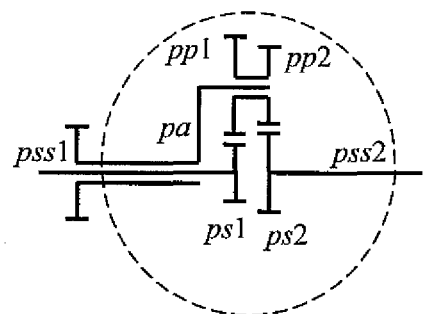
FIGS. 3A and 3B are similar internal schematic views of planetary gear trains applied in the independently controllable transmission mechanism in accordance with the preferred embodiment of the present invention.
Figure 3B:
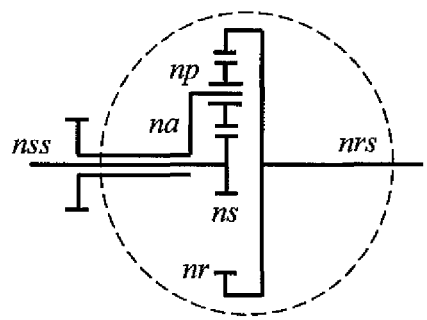
Figure 4:
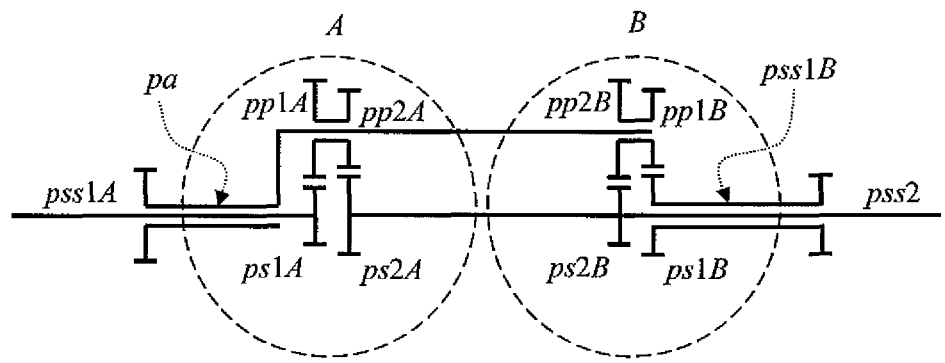
FIGS. 4 through 28 are similar internal schematic views of several combinations of two planetary gear trains formed in the independently controllable transmission mechanism in accordance with a third through twenty-seventh embodiments of the present invention.
Figure 5:
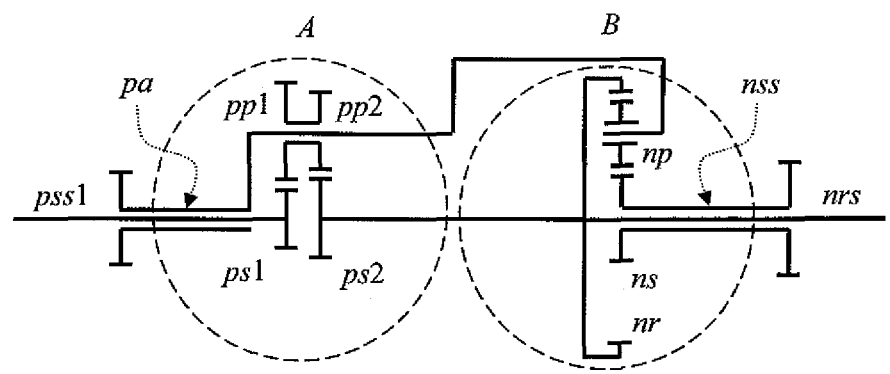
Figure 6:
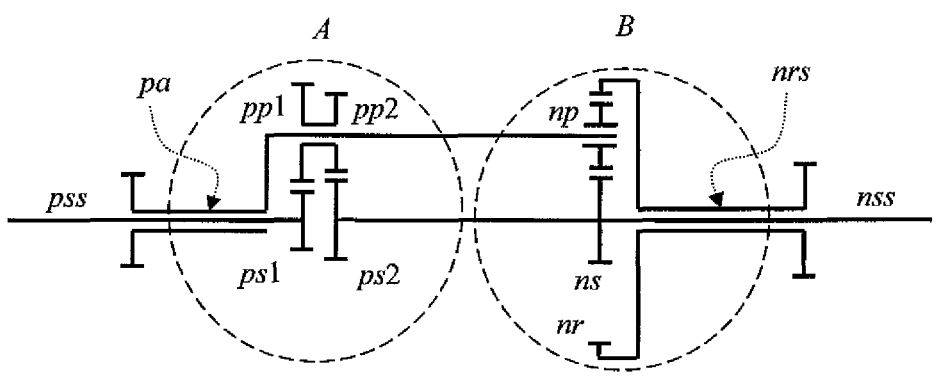
Figure 7:
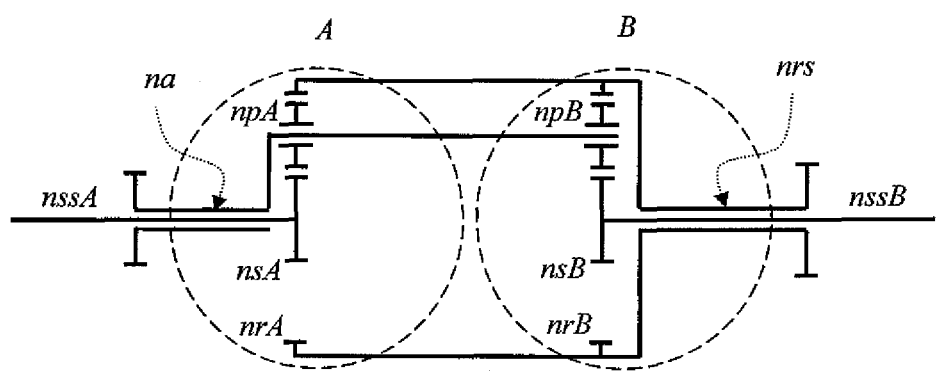
Figure 8:
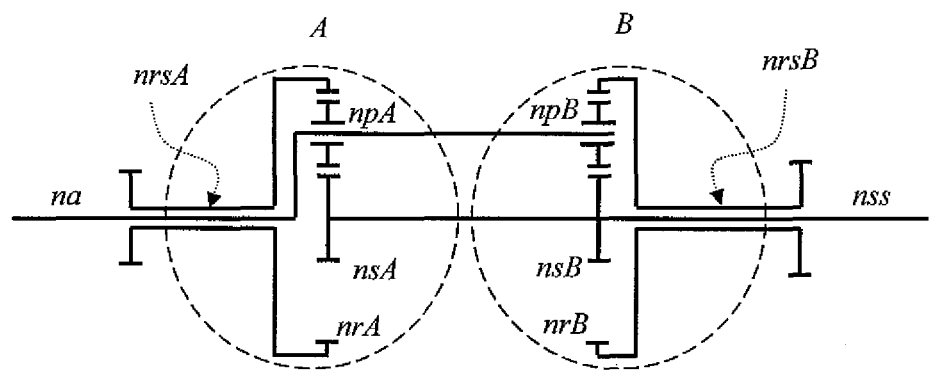
Figure 9:
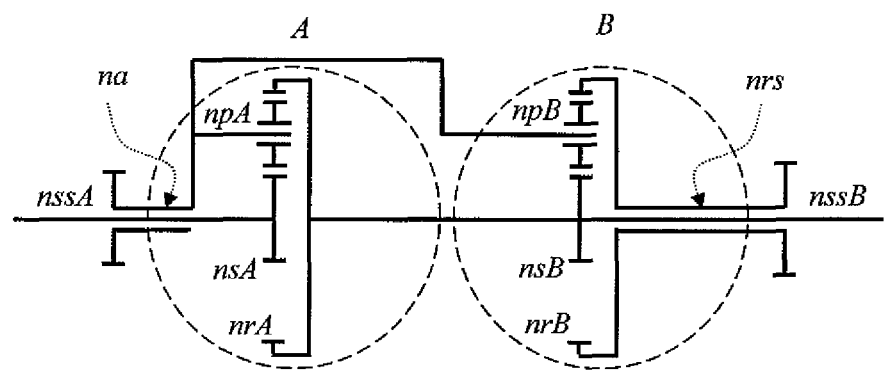
Figure 10:
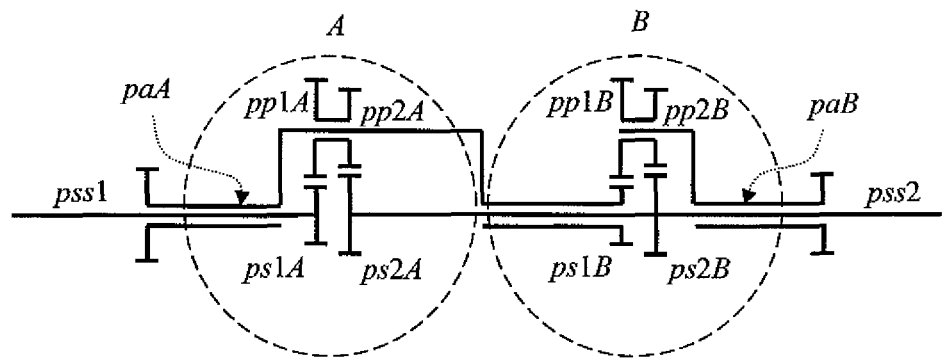
Figure 11:
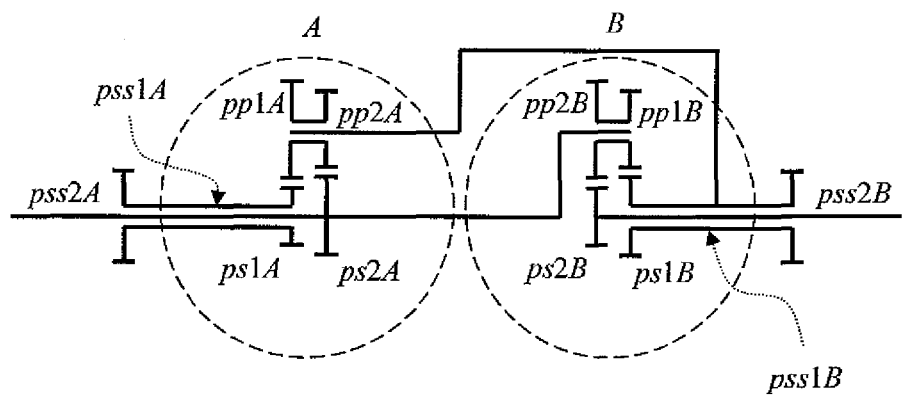
Figure 12:
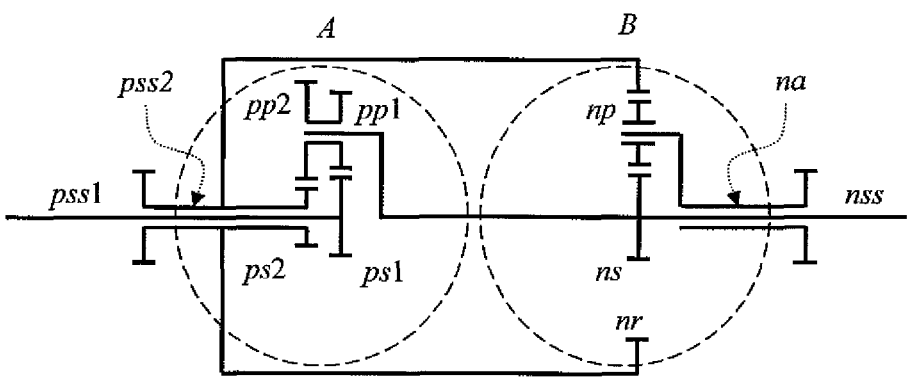
Figure 13:
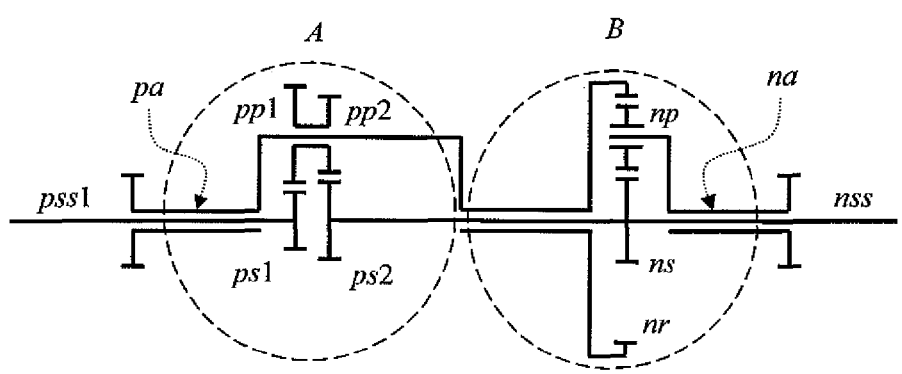
Figure 14:
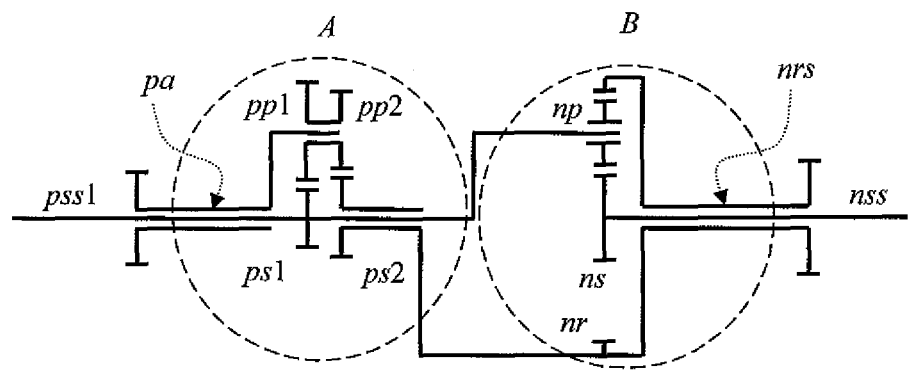
Figure 15:
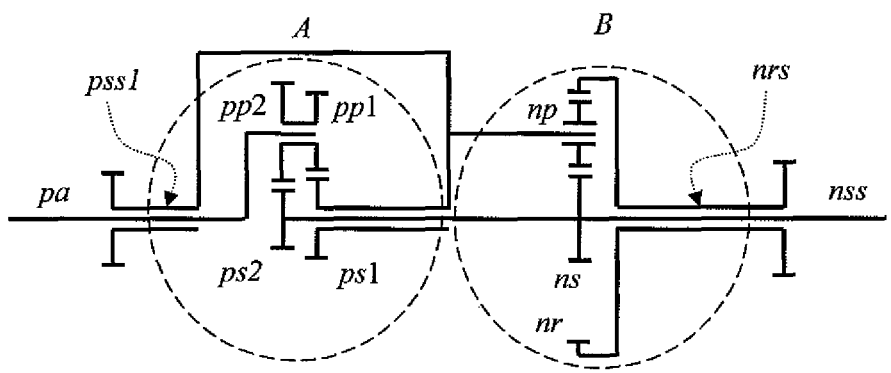
Figure 16:
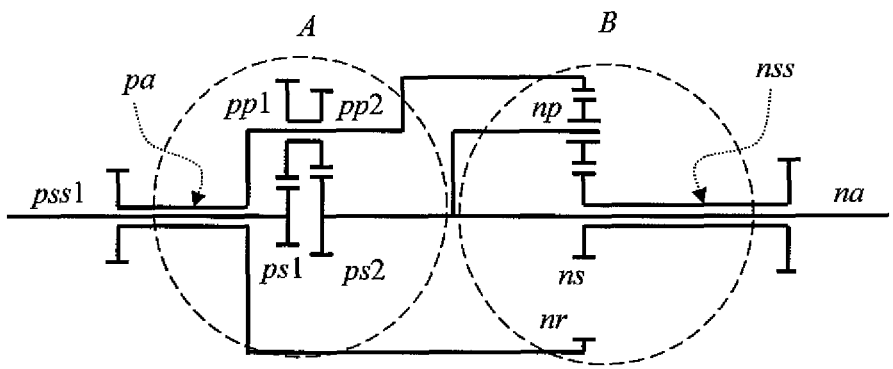
Figure 17:
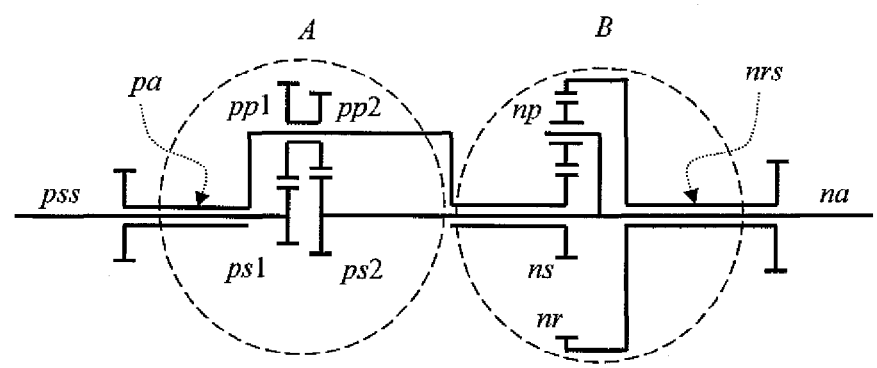
Figure 18:
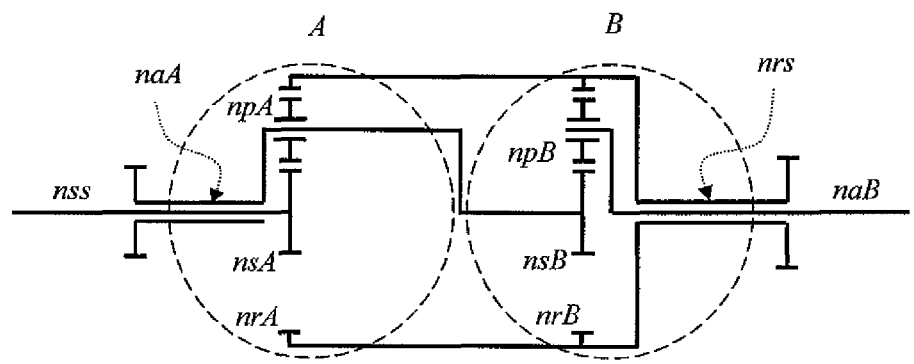
Figure 19:
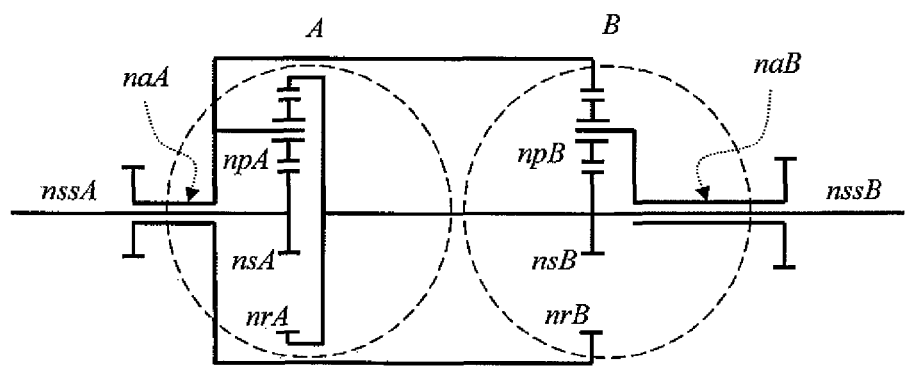
Figure 20:
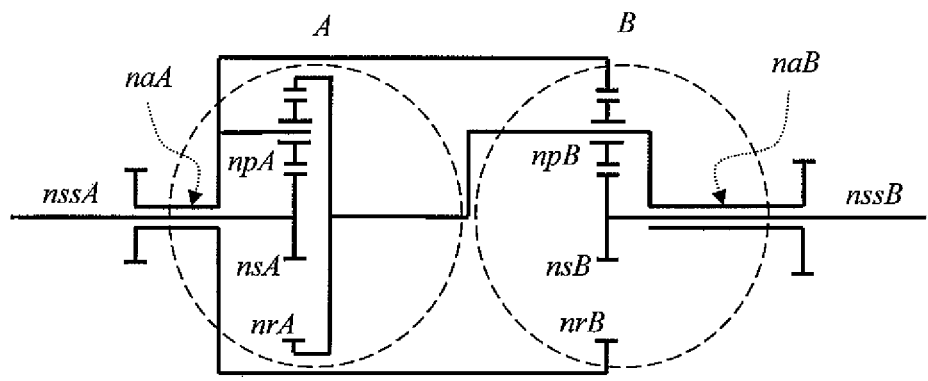
Figure 21:
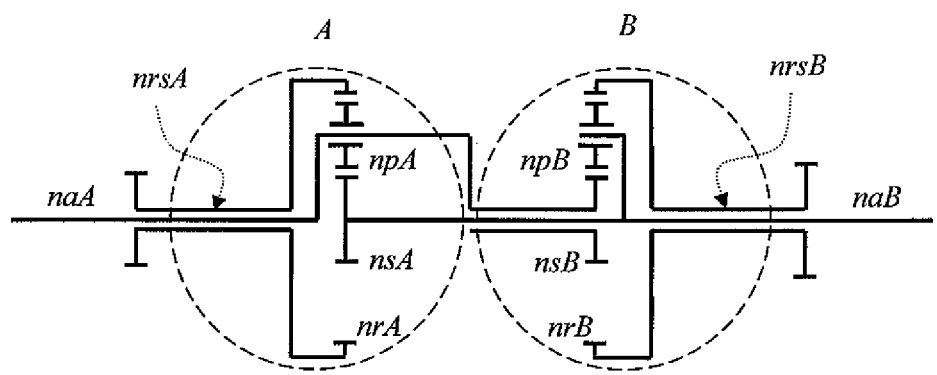
Figure 22:
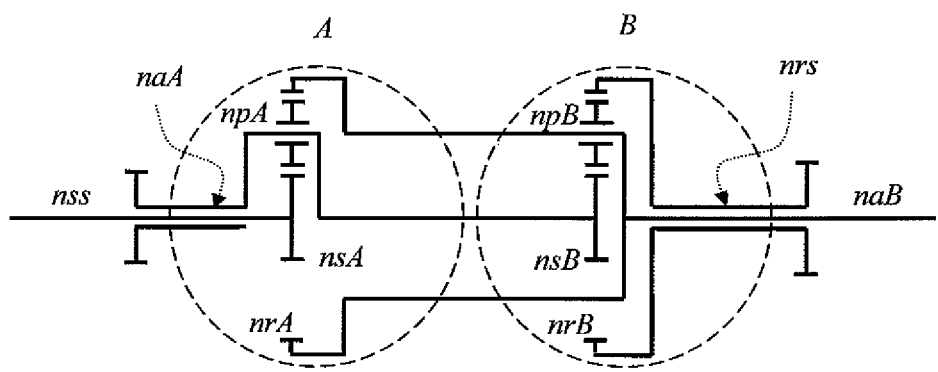
Figure 23:
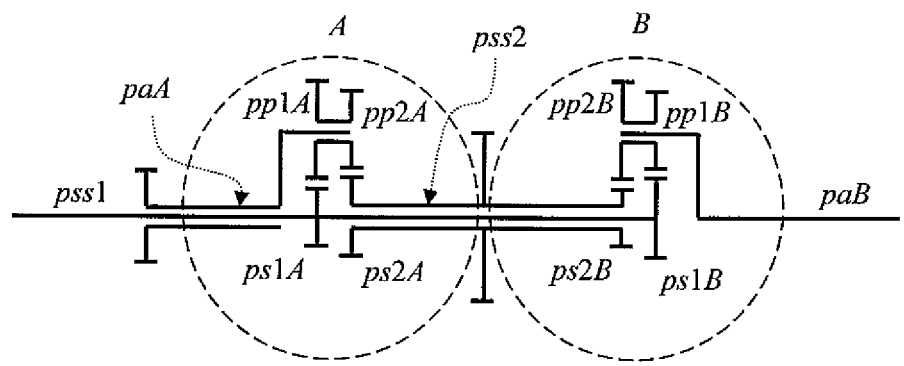
Figure 24:
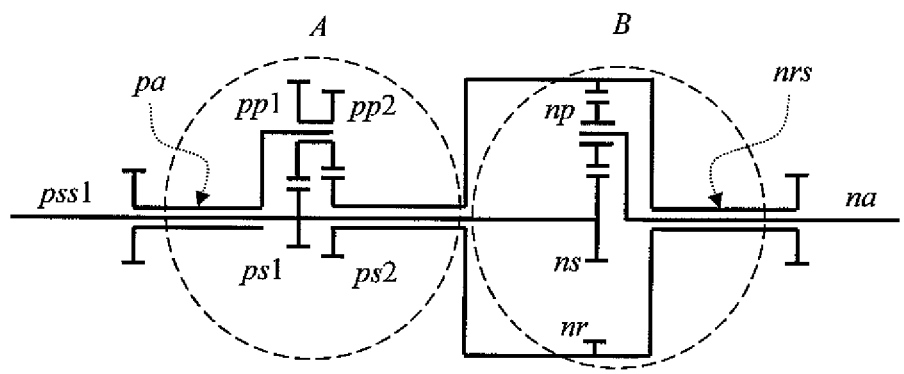
Figure 25:
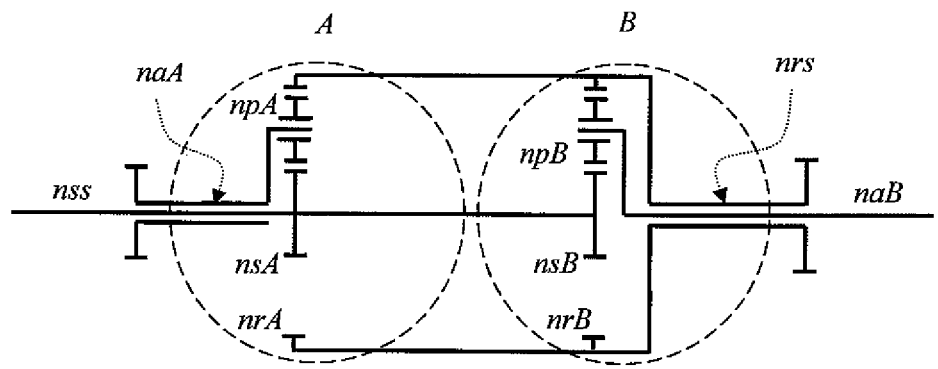
Figure 26:
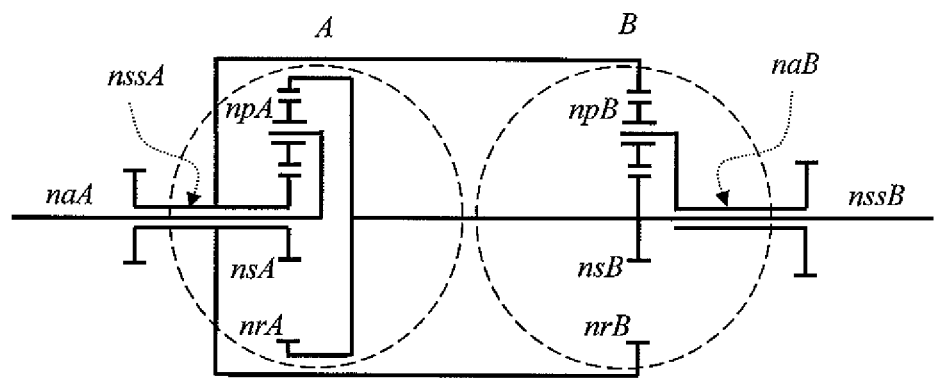
Figure 27:
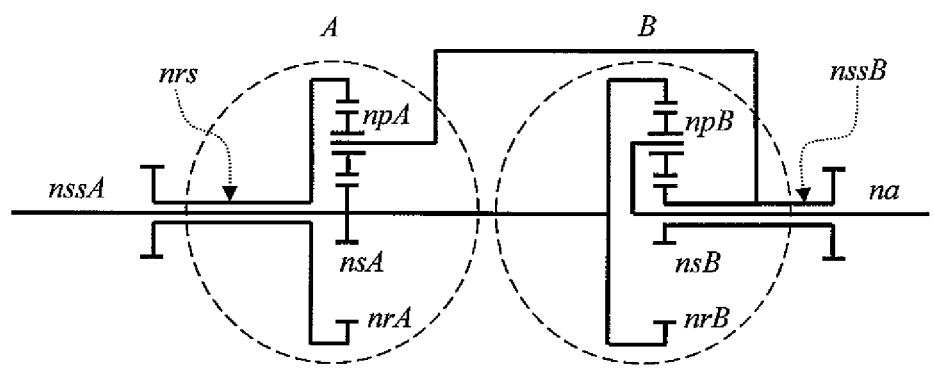
Figure 28:
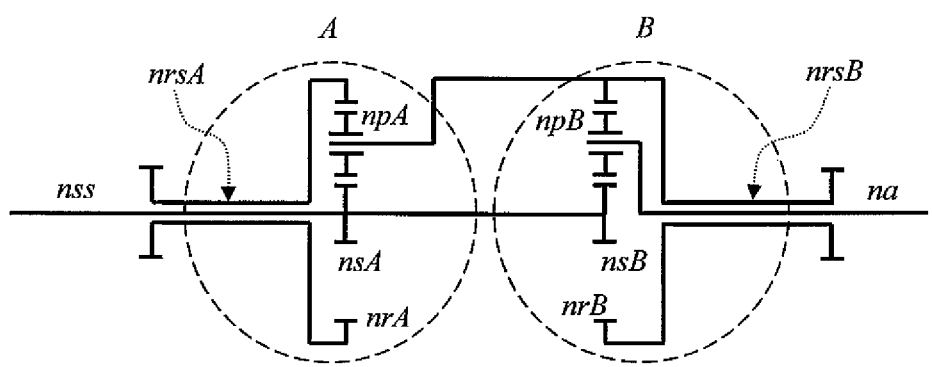

FIGS. 3A and 3B illustrate the planetary gear trains applied in the independently controllable transmission mechanism in accordance with the preferred embodiment of the present invention, wherein two examples of internal configurations of the planetary gear trains are shown, which are not limitative of the present invention.

Turning now to FIG. 3A, the first example of the planetary gear train includes a sun gear identified as ps1, a sun-gear rotational axle identified as pss1, a central gear identified as ps2, a central-gear rotational axle identified as pss2, at least one compound planetary gear set formed with a first planetary gear identified as pp1 and a second planetary gear identified as pp2, and a planet gear carrier identified as pa. The first planetary gear identified as pp1 and the second planetary gear identified as pp2 are correspondingly engaged with the sun gear psi. and the central gear ps2. The sun-gear rotational axle pss1 and the planet gear carrier pa are in perfect alignment with each other and coaxial. When the planet gear carrier pa is fixed, the sun-gear rotational axle pss1 and the central-gear rotational axle pss2 have same rotational directions and a positive ratio of rotational speeds. As is explained above, the planetary gear train is selected from a planetary gear train with a positive speed ratio. Referring again to FIGS. 2A, 2B and 3A, the sun-gear rotational axle pss1, the central-gear rotational axle pss2 and the planet gear carrier pa can be performed as the first rotational axle OP, the second rotational axle AD and the third rotational axle AE of the first planetary gear train 1. Alternatively, the sun-gear rotational axle pss1, the central-gear rotational axle pss2 and the planet gear carrier pa can be performed as the first rotational axle CR, the second rotational axle BD and the third rotational axle BE of the second planetary gear train 2.

Turning now to FIG. 3B, the second example of the planetary gear train includes a sun gear identified as ns, a sun-gear rotational axle identified as nss, a ring gear identified as nr, a ring-gear rotational axle identified as nrs, at least one planetary gear identified as np and a planet gear carrier identified as na. When the planet gear carrier na is fixed, the sun-gear rotational axle nss and the ring-gear rotational axle nrs are rotated in reverse directions and have a negative ratio of rotational speeds. As is explained above, the planetary gear train is selected from a planetary gear train with a negative speed ratio.

Referring again to FIGS. 2A, 2B and 3B, the sun-gear rotational axle nss, the ring-gear rotational axle nrs and the planet gear carrier na can be performed as the first rotational axle OP, the second rotational axle AD and the third rotational axle AE of the first planetary gear train 1. Alternatively, the sun-gear rotational axle nss, the ring-gear rotational axle nrs and the planet gear carrier na can be performed as the first rotational axle CR, the second rotational axle BD and the third rotational axle BE of the second planetary gear train 2.

Referring back to FIGS. 2A and 2B, the relation between the speeds of the first rotational axle OP of the first planetary gear train 1 (i.e. first power output end) and the first rotational axle CR of the second planetary gear train 2 (i.e. transmission control end) in accordance with the present invention are $$\frac{n_{OP}}{n_{CR}} = 1$$

given as:
where $n_{op}$ and $n_{CR}$ are speeds of the first rotational axle OP of the first planetary gear train 1 (i.e. first power output end) and the first rotational axle CR of the second planetary gear train 2 (i.e. transmission control end).

Furthermore, the relation between the speeds of the second rotational axle AD of the first planetary gear train 1 and the third rotational axle BE of the second planetary gear train 2 in accordance with the present invention are $$\frac{n_{AD}}{n_{BE}} = 1$$

given as:
where $n_{AD}$ and $n_{BE}$ are speeds of the second rotational axle AD of the first planetary gear train 1 and the third rotational axle BE of the second planetary gear train 2.

Furthermore, the relation between the speeds of the second rotational axle BD of the second planetary gear train 2 and the third rotational axle AE of the first planetary gear train 1 in accordance with the present invention are $$\frac{n_{BD}}{n_{AE}} = 1$$

given as:
where $n_{BD}$ and $n_{AE}$ are speeds of the second rotational axle BD of the second planetary gear train 2 and the third rotational axle AE of the first planetary gear train 1.

FIGS. 4 through 28 illustrate several combinations of two planetary gear trains formed in the independently controllable transmission mechanism in accordance with a third through twenty-seventh embodiments of the present invention, wherein twenty five embodiments of the transmission mechanisms are shown, which are not limitative of the present invention. Turning now to FIGS. 4 through 28, the transmission mechanism includes two planetary gear trains (dotted lines in two circles, which correspond to FIGS. 3A and 3B). As has been described in FIGS. 3A and 3B, the detailed configurations of the planetary gear trains in FIGS. 4 through 28 will not be described for the sake of clarity.

Referring again to FIGS. 2A, 2B and 4, in the third embodiment, the two planetary gear trains correspond to the first planetary gear train 1 and the second planetary gear train 2 and are comprised of two planetary gear trains each of which has a positive speed ratio. Two sun-gear rotational axles pss1A, pss1B of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle pa while the two central gears ps2A, ps2B have a common rotational axle pss2. The two common rotational axles pa, pss2 perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 5, in the fourth embodiment, the two planetary gear trains correspond to the first planetary gear train 1 and the second planetary gear train 2 and are comprised of a planetary gear train having a positive speed ratio and a planetary gear train having a negative speed ratio. Two sun-gear rotational axles pss1, nss of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle pa while the central gear ps2 and the ring gear nr have a common rotational axle nrs. The two common rotational axles pa, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 6, in the fifth embodiment, the two planetary gear trains correspond to the first planetary gear train 1 and the second planetary gear train 2 and are comprised of a planetary gear train having a positive speed ratio and a planetary gear train having a negative speed ratio. A sun-gear rotational axle pss and a ring-gear rotational axle nrs of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle pa while the central gear ps2 and the sun gear ns have a common rotational axle nss. The two common rotational axles pa, nss perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 7, in the sixth embodiment, the two planetary gear trains correspond to the first planetary gear train 1 and the second planetary gear train 2 and are comprised of two planetary gear trains each of which has a negative speed ratio. Two sun-gear rotational axles nssA, nssB of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle na while the two ring gears nrA, nrB have a common rotational axle nrs. The two common rotational axles na, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 8, in the seventh embodiment, the two planetary gear trains correspond to the first planetary gear train 1 and the second planetary gear train 2 and are comprised of two planetary gear trains each of which has a negative speed ratio. Two ring-gear rotational axles nrsA, nrsB of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle na while the two sun gear nsA, nsB have a common rotational axle nss. The two common rotational axles na, nss perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 9, in the eighth embodiment, the two planetary gear trains correspond to the first planetary gear train 1 and the second planetary gear train 2 and are comprised of two planetary gear trains each of which has a negative speed ratio. A sun-gear rotational axle nssA and a ring-gear rotational axle nrs of the two planetary gear trains perform as the first power output end of the first planetary gear train 1 (i.e. first rotational axle OP) and the transmission control end of the second planetary gear train 2 (i.e. first rotational axle CR). The two planet gear carriers have a common rotational axle na while the ring gear nrA and the sun gear nsB have a common rotational axle nssB. The two common rotational axles na, nssB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 10, in the ninth embodiment, the two planetary gear trains correspond to the first planetary gear train 1 and the second planetary gear train 2 and are comprised of two planetary gear trains each of which has a positive speed ratio. A sun-gear rotational axle pss1 and a planet gear carrier paB of the two planetary gear trains perform as the first power output end of the first planetary gear train 1 (i.e. first rotational axle OP) and the transmission control end of the second planetary gear train 2 (i.e. first rotational axle CR). A planet gear carrier and a sun gear ps1B of the planetary gear trains have a common rotational axle paA while the two central gears ps2A, ps2B have a common rotational axle pss2. The two common rotational axles paA, pss2 perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 11, in the tenth embodiment, the two planetary gear trains correspond to the first planetary gear train 1 and the second planetary gear train 2 and are comprised of two planetary gear trains each of which has a positive speed ratio. A sun-gear rotational axle pss1A and a central-gear rotational axle pss2B of the two planetary gear trains perform as the first power output end of the first planetary gear train 1 (i.e. first rotational axle OP) and the transmission control end of the second planetary gear train 2 (i.e. first rotational axle CR). A central gear ps2A and a planet gear carrier of the planetary gear trains have a common rotational axle pss2A while a planet gear carrier and a sun gear ps1B of the planetary gear trains have a common rotational axle pss1B. The two common rotational axles pss2A, pss1B perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 12, in the eleventh embodiment, the two planetary gear trains correspond to the first planetary gear train 1 and the second planetary gear train 2 and are comprised of a planetary gear train having a positive speed ratio and a planetary gear train having a negative speed ratio. A sun-gear rotational axle pss1 and a planet gear carrier na of the two planetary gear trains perform as the first power output end of the first planetary gear train 1 (i.e. first rotational axle OP) and the transmission control end of the second planetary gear train 2 (i.e. first rotational axle CR). A central gear ps2 and a ring gear nr of the planetary gear trains have a common rotational axle pss2 while a planet gear carrier and a sun gear ns of the planetary gear trains have a common rotational axle nss. The two common rotational axles pss2, nss perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 13, in the twelfth embodiment, the two planetary gear trains correspond to the first planetary gear train 1 and the second planetary gear train 2 and are comprised of a planetary gear train having a positive speed ratio and a planetary gear train having a negative speed ratio. A sun-gear rotational axle pss1 and a planet gear carrier na of the two planetary gear trains perform as the first power output end of the first planetary gear train 1 (i.e. first rotational axle OP) and the transmission control end of the second planetary gear train 2 (i.e. first rotational axle CR). A planet gear carrier and a ring gear nr of the planetary gear trains have a common rotational axle pa while a central gear ps2 and a sun gear ns of the planetary gear trains have a common rotational axle nss. The two common rotational axles pa, nss perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 14, in the thirteenth embodiment, the two planetary gear trains correspond to the first planetary gear train 1 and the second planetary gear train 2 and are comprised of a planetary gear train having a positive speed ratio and a planetary gear train having a negative speed ratio. A planet gear carrier pa and a sun-gear rotational axle nss of the two planetary gear trains perform as the first power output end of the first planetary gear train 1 (i.e. first rotational axle OP) and the transmission control end of the second planetary gear train 2 (i.e. first rotational axle CR). A sun gear psi and a planet gear carrier of the planetary gear trains have a common rotational axle pss1 while a central gear ps2 and a ring gear nr of the planetary gear trains have a common rotational axle nrs. The two common rotational axles pss1, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 15, in the fourteenth embodiment, the two planetary gear trains correspond to the first planetary gear train 1 and the second planetary gear train 2 and are comprised of a planetary gear train having a positive speed ratio and a planetary gear train having a negative speed ratio. A planet gear carrier pa and a ring-gear rotational axle nrs of the two planetary gear trains perform as the first power output end of the first planetary gear train 1 (i.e. first rotational axle OP) and the transmission control end of the second planetary gear train 2 (i.e. first rotational axle CR). A sun gear psi and a planet gear carrier of the planetary gear trains have a common rotational axle pss1 while a central gear ps2 and a sun gear ns of the planetary gear trains have a common rotational axle nss. The two common rotational axles pss1, nss perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 16, in the fifteenth embodiment, the two planetary gear trains correspond to the first planetary gear train 1 and the second planetary gear train 2 and are comprised of a planetary gear train having a positive speed ratio and a planetary gear train having a negative speed ratio. Two sun-gear rotational axles pss1, nss of the two planetary gear trains perform as the first power output end of the first planetary gear train 1 (i.e. first rotational axle OP) and the transmission control end of the second planetary gear train 2 (i.e. first rotational axle CR). A planet gear carrier and a ring gear nr of the planetary gear trains have a common rotational axle pa while a central gear ps2 and a planet gear carrier of the planetary gear trains have a common rotational axle na. The two common rotational axles pa, na perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 17, in the sixteenth embodiment, the two planetary gear trains correspond to the first planetary gear train 1 and the second planetary gear train 2 and are comprised of a planetary gear train having a positive speed ratio and a planetary gear train having a negative speed ratio. A sun-gear rotational axle pss and a ring-gear rotational axle nrs of the two planetary gear trains perform as the first power output end of the first planetary gear train 1 (i.e. first rotational axle OP) and the transmission control end of the second planetary gear train 2 (i.e. first rotational axle CR). A planet gear carrier and a sun gear ns of the planetary gear trains have a common rotational axle pa while a central gear ps2 and a planet gear carrier of the planetary gear trains have a common rotational axle na. The two common rotational axles pa, na perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 18, in the seventeenth embodiment, the two planetary gear trains correspond to the first planetary gear train 1 and the second planetary gear train 2 and are comprised of two planetary gear trains each of which has a negative speed ratio. A sun-gear rotational axle nss and a planet gear carrier naB of the two planetary gear trains perform as the first power output end of the first planetary gear train 1 (i.e. first rotational axle OP) and the transmission control end of the second planetary gear train 2 (i.e. first rotational axle CR). A planet gear carrier and a sun gear nsB of the planetary gear trains have a common rotational axle naA while two ring gears nrA, nrB of the planetary gear trains have a common rotational axle nrs. The two common rotational axles naA, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 19, in the eighteenth embodiment, the two planetary gear trains correspond to the first planetary gear train 1 and the second planetary gear train 2 and are comprised of two planetary gear trains each of which has a negative speed ratio. A sun-gear rotational axle nssA and a planet gear carrier naB of the two planetary gear trains perform as the first power output end of the first planetary gear train 1 (i.e. first rotational axle OP) and the transmission control end of the second planetary gear train 2 (i.e. first rotational axle CR). A planet gear carrier and a ring gear nrB of the planetary gear trains have a common rotational axle naA while a ring gear nrA and a sun gear nsB of the planetary gear trains have a common rotational axle nssB. The two common rotational axles naA, nssB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 20, in the nineteenth embodiment, the two planetary gear trains correspond to the first planetary gear train 1 and the second planetary gear train 2 and are comprised of two planetary gear trains each of which has a negative speed ratio. Two sun-gear rotational axles nssA, nssB of the two planetary gear trains perform as the first power output end of the first planetary gear train 1 (i.e. first rotational axle OP) and the transmission control end of the second planetary gear train 2 (i.e. first rotational axle CR). A planet gear carrier and a ring gear nrB of the planetary gear trains have a common rotational axle naA while a ring gear nrA and a planet gear carrier of the planetary gear trains have a common rotational axle naB. The two common rotational axles naA, naB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 21, in the twentieth embodiment, the two planetary gear trains correspond to the first planetary gear train 1 and the second planetary gear train 2 and are comprised of two planetary gear trains each of which has a negative speed ratio. Two ring-gear rotational axles nrsA, nrsB of the two planetary gear trains perform as the first power output end of the first planetary gear train 1 (i.e. first rotational axle OP) and the transmission control end of the second planetary gear train 2 (i.e. first rotational axle CR). A planet gear carrier and a sun gear nsB of the planetary gear trains have a common rotational axle naA while a sun gear nsA and a planet gear carrier of the planetary gear trains have a common rotational axle naB. The two common rotational axles naA, naB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 22, in the twenty-first embodiment, the two planetary gear trains correspond to the first planetary gear train 1 and the second planetary gear train 2 and are comprised of two planetary gear trains each of which has a negative speed ratio. A sun-gear rotational axles nss and a ring-gear rotational axle nrs of the two planetary gear trains perform as the first power output end of the first planetary gear train 1 (i.e. first rotational axle OP) and the transmission control end of the second planetary gear train 2 (i.e. first rotational axle CR). A planet gear carrier and a sun gear nsB of the planetary gear trains have a common rotational axle naA while a ring gear nrA and a planet gear carrier of the planetary gear trains have a common rotational axle naB. The two common rotational axles naA, naB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 23, in the twenty-second embodiment, the two planetary gear trains correspond to the first planetary gear train 1 and the second planetary gear train 2 and are comprised of two planetary gear trains each of which has a positive speed ratio. Two planet gear carriers paA, paB of the two planetary gear trains perform as the first power output end of the first planetary gear train 1 (i.e. first rotational axle OP) and the transmission control end of the second planetary gear train 2 (i.e. first rotational axle CR). Two sun gears ps1A, ps1B of the planetary gear trains have a common rotational axle pss1 while two central gears ps2A, ps2B of the planetary gear trains have a common rotational axle pss2. The two common rotational axles pss1, pss2 perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 24, in the twenty-third embodiment, the two planetary gear trains correspond to the first planetary gear train 1 and the second planetary gear train 2 and are comprised of a planetary gear train having a positive speed ratio and a planetary gear train having a negative speed ratio. Two planet gear carriers pa, na of the two planetary gear trains perform as the first power output end of the first planetary gear train 1 (i.e. first rotational axle OP) and the transmission control end of the second planetary gear train 2 (i.e. first rotational axle CR). Two sun gears psi, ns of the planetary gear trains have a common rotational axle pss1 while a central gear ps2 and a ring gear nr of the planetary gear trains have a common rotational axle nrs. The two common rotational axles pss1, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 25, in the twenty-fourth embodiment, the two planetary gear trains correspond to the first planetary gear train 1 and the second planetary gear train 2 and are comprised of two planetary gear trains each of which has a negative speed ratio. Two planet gear carriers naA, naB of the two planetary gear trains perform as the first power output end of the first planetary gear train 1 (i.e. first rotational axle OP) and the transmission control end of the second planetary gear train 2 (i.e. first rotational axle CR). Two sun gears nsA, nsB of the planetary gear trains have a common rotational axle nss while two ring gears nrA, nrB of the planetary gear trains have a common rotational axle nrs. The two common rotational axles nss, nrs perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 26, in the twenty-fifth embodiment, the two planetary gear trains correspond to the first planetary gear train 1 and the second planetary gear train 2 and are comprised of two planetary gear trains each of which has a negative speed ratio. Two planet gear carriers naA, naB of the two planetary gear trains perform as the first power output end of the first planetary gear train 1 (i.e. first rotational axle OP) and the transmission control end of the second planetary gear train 2 (i.e. first rotational axle CR). A sun gear nsA and a ring gear nrB of the planetary gear trains have a common rotational axle nssA while a ring gear nrA and a sun gear nsB of the planetary gear trains have a common rotational axle nssB. The two common rotational axles nssA, nssB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 27, in the twenty-sixth embodiment, the two planetary gear trains correspond to the first planetary gear train 1 and the second planetary gear train 2 and are comprised of two planetary gear trains each of which has a negative speed ratio. A ring gear rotational axle nrs and a planet gear carrier na of the two planetary gear trains perform as the first power output end of the first planetary gear train 1 (i.e. first rotational axle OP) and the transmission control end of the second planetary gear train 2 (i.e. first rotational axle CR). A sun gear nsA and a ring gear nrB of the planetary gear trains have a common rotational axle nssA while a planet gear carrier and a sun gear nsB of the planetary gear trains have a common rotational axle nssB. The two common rotational axles nssA, nssB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Referring again to FIGS. 2A, 2B and 28, in the twenty-seventh embodiment, the two planetary gear trains correspond to the first planetary gear train 1 and the second planetary gear train 2 and are comprised of two planetary gear trains each of which has a negative speed ratio. A ring gear rotational axle nrsA and a planet gear carrier na of the two planetary gear trains perform as the first power output end of the first planetary gear train 1 (i.e. first rotational axle OP) and the transmission control end of the second planetary gear train 2 (i.e. first rotational axle CR). Two sun gears nsA, nsB of the planetary gear trains have a common rotational axle nss while a planet gear carrier and a ring gear nrB of the planetary gear trains have a common rotational axle nrsB. The two common rotational axles nss, nrsB perform as the second rotational axle AD of the first planetary gear train 1 (free transmission end in FIG. 2A or first power input end in FIG. 2B) and the second rotational axle BD of the second planetary gear train 2 (first power input end in FIG. 2A or free transmission end in FIG. 2B).

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An independently controllable transmission mechanism comprising:
    a first planetary gear train including a first power output end;
    a second planetary gear train connected with the first planetary gear train, the second planetary gear train including a transmission control end;
    a first power input end provided on the second planetary gear train; and
    a free transmission end provided on the first planetary gear train;
    wherein the transmission control end is used to control the free transmission end to be functioned as a second power input end or a second power output end.

2. The independently controllable transmission mechanism as defined in claim 1, wherein each of the first planetary gear train and the second planetary gear train has a positive speed ratio.

3. The independently controllable transmission mechanism as defined in claim 1, wherein each of the first planetary gear train and the second planetary gear train has a negative speed ratio.

4. The independently controllable transmission mechanism as defined in claim 1, wherein the first planetary gear train has a positive speed ratio while the second planetary gear train has a negative speed ratio.

5. The independently controllable transmission mechanism as defined in claim 1, wherein the first planetary gear train has a negative speed ratio while the second planetary gear train has a positive speed ratio.

6. The independently controllable transmission mechanism as defined in claim 1, wherein the first planetary gear train includes a first rotational axle, a second rotational axle and a third rotational axle; the first rotational axle of the first planetary gear train performed as the first power output end, the second rotational axle of the first planetary gear train performed as the free transmission end, and the third rotational axle of the first planetary gear train connected with the second planetary gear train; and
    wherein the second planetary gear train includes a first rotational axle, a second rotational axle and a third rotational axle; the first rotational axle of the second planetary gear train performed as the transmission control end, the second rotational axle of the second planetary gear train performed as the first power input end, and the third rotational axle of the second planetary gear train connected with the first planetary gear train.

7. An independently controllable transmission mechanism comprising:
    a first planetary gear train including a first power output end;
    a second planetary gear train connected with the first planetary gear train, the second planetary gear train including a transmission control end;
    a first power input end provided on the first planetary gear train; and
    a free transmission end provided on the second planetary gear train;
    wherein the transmission control end is used to control the free transmission end to be functioned as a second power input end or a second power output end.

8. The independently controllable transmission mechanism as defined in claim 7, wherein each of the first planetary gear train and the second planetary gear train has a positive speed ratio.

9. The independently controllable transmission mechanism as defined in claim 7, wherein each of the first planetary gear train and the second planetary gear train has a negative speed ratio.

10. The independently controllable transmission mechanism as defined in claim 7, wherein the first planetary gear train has a positive speed ratio while the second planetary gear train has a negative speed ratio.

11. The independently controllable transmission mechanism as defined in claim 7, wherein the first planetary gear train has a negative speed ratio while the second planetary gear train has a positive speed ratio.

12. The independently controllable transmission mechanism as defined in claim 7, wherein the first planetary gear train includes a first rotational axle, a second rotational axle and a third rotational axle; the first rotational axle of the first planetary gear train performed as the first power output end, the second rotational axle of the first planetary gear train performed as the first power input end, and the third rotational axle of the first planetary gear train connected with the second planetary gear train; and wherein the second planetary gear train includes a first rotational axle, a second rotational axle and a third rotational axle; the first rotational axle of the second planetary gear train performed as the transmission control end, the second rotational axle of the second planetary gear train performed as the free transmission end, and the third rotational axle of the second planetary gear train connected with the first planetary gear train.

13. An independently controllable transmission mechanism comprising:
two planetary gear trains connected each other;
a first power output end provided on the combination of the two planetary gear trains;
a transmission control end provided on the combination of the two planetary gear trains;
a first power input end provided on the combination of the two planetary gear trains; and
a free transmission end provided on the combination of the two planetary gear trains;
wherein the transmission control end is used to control the free transmission end to be functioned as a second power input end or a second power output end.

14. The independently controllable transmission mechanism as defined in claim 13, wherein each of the two planetary gear trains has a positive speed ratio.

15. The independently controllable transmission mechanism as defined in claim 13, wherein each of the two planetary gear trains has a negative speed ratio.

16. The independently controllable transmission mechanism as defined in claim 13, wherein one of the two planetary gear trains has a positive speed ratio while the other has a negative speed ratio.

17. The independently controllable transmission mechanism as defined in claim 13, wherein the combination of the two planetary gear trains includes a first rotational axle, a second rotational axle, a third rotational axle, a fourth rotational axle, a fifth rotational axle and a sixth rotational axle; and wherein the first rotational axle performed as the first power output end, the second rotational axle performed as the free transmission end, the third rotational axle connected between the two planetary gear trains, the fourth rotational axle performed as the transmission control end, the fifth rotational axle performed as the first power input end, and the sixth rotational axle connected between the two planetary gear trains.

18. The independently controllable transmission mechanism as defined in claim 13, wherein the combination of the two planetary gear trains includes a first rotational axle, a second rotational axle, a third rotational axle, a fourth rotational axle, a fifth rotational axle and a sixth rotational axle; and wherein the first rotational axle performed as the first power output end, the second rotational axle performed as the first power input end, the third rotational axle connected between the two planetary gear trains, the fourth rotational axle performed as the transmission control end, the fifth rotational axle performed as the free transmission end, and the sixth rotational axle connected between the two planetary gear trains.

* * * * *